United States Patent [19]

Suzuki et al.

[11] Patent Number: 5,007,726
[45] Date of Patent: Apr. 16, 1991

[54] COATED EYEGLASSES FRAME MEMBER

[75] Inventors: Akio Suzuki, Gunma; Hirofumi Kishita, Annaka; Shigehisa Sonegawa, Annaka; Masaaki Matumura, Annaka; Takeshi Hoashimoto, Annaka, all of Japan

[73] Assignee: Shin-Etsu Chemical Co., Ltd., Tokyo, Japan

[21] Appl. No.: 432,491

[22] Filed: Nov. 7, 1989

[30] Foreign Application Priority Data

Nov. 8, 1988 [JP] Japan .................. 63-281671

[51] Int. Cl.$^5$ .................. G02C 5/02; G02C 5/12; G02C 5/14
[52] U.S. Cl. .................. 351/41; 351/132; 351/139; 351/122
[58] Field of Search .................. 351/78, 139, 122, 132, 351/41, 79, 80, 81, 82, 87, 88, 136, 137, 138; 2/448, 446

[56] References Cited

U.S. PATENT DOCUMENTS 4,375,911 3/1983 Bononi .................. 351/122

FOREIGN PATENT DOCUMENTS 2044667 9/1980 United Kingdom .................. 351/41

Primary Examiner—Rodney B. Bovernick
Attorney, Agent, or Firm—Birch, Stewart, Kolasch & Birch

[57] ABSTRACT

An eyeglass member, typically a nose pad or a temple end piece, which maintains its aesthetic appearance and close fit over long periods of service: The member has a cured coating of a fluorine-containing silicone on its surface or is made of a fluorine-containing silicone.

6 Claims, 1 Drawing Sheet

COATED EYEGLASSES FRAME MEMBER

This invention relates to eyeglasses members such as nose pads and temple end pieces.

BACKGROUND OF THE INVENTION

Nose pads and temple end pieces of eyeglass frames desirably to present a soft and anti-slip contact to the nose or ears. For example, nose pads whose surface layer is formed from solid or spongy silicone rubber are often used since they offer a soft contact, pleasant feel, and anti-slip hold to the nose. In one type of pad, a core connected to an eyeglass frame front is directly coated with solid or spongy silicone rubber. Another type of pad uses a core coated with a thermoplastic resin such as clear nylon which is in turn coated with solid or spongy silicone rubber. In either case, that surface of a pad which is in contact with the nose is constructed from solid or spongy silicone rubber.

Such nose pads undesirably tend to yellow or whiten, which detracts from their aesthetic appearance, after long times of service. This discoloration occurs because the siloxane linkages forming the skeleton of the silicone rubber allow sweat and oily substances to penetrate into the solid or spongy silicone rubber from the surface. Temple end pieces generally suffer from the same type of problem.

SUMMARY OF THE INVENTION

Therefore, an object of the present invention is to provide an eyeglass member which is substantially free from a loss of aesthetic appearance as by yellowing or clouding due to contact with sweat and oil over long periods of service, while at the same time maintaining a pleasant feel and hold.

According to the present invention, there is provided a member for eyeglasses having a surface coated with a cured fluorine-containing silicone or fluorosilicone. The member is associated with an eyeglasses frame and typically constitutes a nose pad or an end piece of a temple.

The cured fluorine containing silicone forms a low surface energy film having excellent water and oil repellency. For example, an eyeglass frame nose pad according to the present invention pad is prepared can be prepared by forming a cured coating of fluorine-containing silicone or fluorosilicone on the surface of a pad substrate constructed of solid or spongy silicone rubber. The coating prevents sweat and oily substances from penetrating into the pad interior (that is, pad substrate constructed of solid or spongy silicone rubber), thus preventing the pad from yellowing or whitening. The cured fluorine-containing silicone firmly adheres to the underlying solid or spongy silicone rubber. The cured coating of fluorine-containing silicone is a colorless clear soft coating which does not detract from the aesthetic appearance, or the close fitness of pads and other eyeglasses members.

The present invention provides an eyeglass member which can maintain an aesthetic appearance and a close fit for a long time use.

DETAILED DESCRIPTION OF THE INVENTION

The eyeglass members of the invention include members of an eyeglass frame which come in contact with the skin or hair of a person, typically the frame's front nose pads and/or temple end pieces or ear pads. The surface of the eyeglass members are covered with a cured coating of fluorine-containing silicone or fluorosilicone.

The base or substrate of which the member is constructed is not particularly limited in shape or material. For example, the substrate may be formed from thermoplastic resins such as clear nylon, polystyrene, acryl, vinyl chloride, polycarbonate, and cellulosic resins and silicone rubbers such as solid and spongy silicone rubbers. Also included as a substrate is a thermoplastic resin (e.g., clear nylon, polystyrene, acryl, vinyl chloride, polycarbonate, and cellulosic resins) coated with a solid or spongy silicone rubber. If desired, the member may also be entirely formed from a cured fluorine containing silicone. In general, it is advantageous to use a substrate of solid or spongy silicone rubber and form a cured coating of fluorine-containing silicone on the entire surface thereof.

Figure 1:
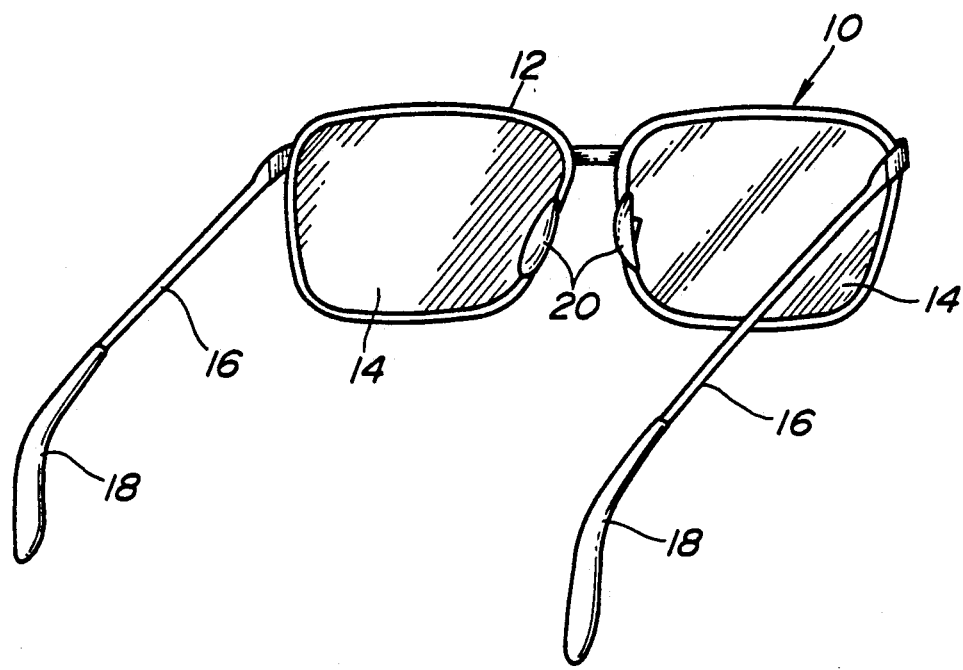
FIG. 1 is a perspective view of a composite pair of eyeglass.

Referring to FIG. 1, there is illustrated a composite pair of eyeglasses 10 as comprising a frame including a front 12 having a pair of lenses 14 held therein and a pair of temples or sides 16 pivotally joined to the front 12. Each temple 16 has an end piece or ear pad 18 at its free end. A pair of nose pads 20 are attached to the frame front 12.

The temple end pieces 18 and nose pads 20 on the surface are coated with a fluorine-containing silicone. These members may be of different structures. The temple end piece 18 or nose pad 20 may include a substrate 22 of a silicone rubber which is circumferentially covered with a surface layer 24 of a fluorine-containing silicone as shown in the cross section of FIG. 2. FIG. 3 shows a substrate 26 consisting of a center core 28 of a thermoplastic resin and a coating layer 30 of a solid or spongy silicone rubber. The substrate 26 is covered with a surface layer 32 of a fluorine-containing silicone. FIG. 4 shows a structure in which a two-layer substrate 34 consisting of a thermoplastic resin layer 36 and a solid or spongy silicone rubber layer 38 is covered with a surface layer 40 of a fluorine-containing silicone. In FIG. 5, the temple end piece 18 or nose pad 20 is a one-component member 42 entirely formed of a fluorine-containing silicone.

Figure 2:
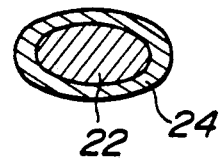
FIGS. 2 to 5 are cross sections of eyeglasses members according to various embodiments of the present invention.
Figure 3:
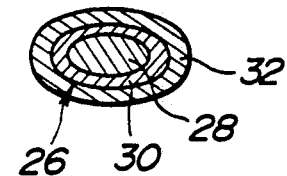
Figure 4:
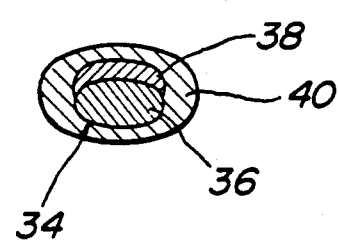
Figure 5:
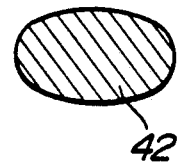

In the structures of FIGS. 2 to 4, the fluorine-containing silicone surface layer may preferably have a thickness of about 1 to about 100 $\mu$m, more preferably from about 1 to about 30 $\mu$m.

The solid and spongy silicone rubbers used herein as the substrate are not particularly limited. Preferred examples include heat vulcanizing silicone rubbers such as dimethylsilicone rubber, methylphenylsilicone rubber, methylphenylvinylsilicone rubber, and methylfluoroalkylsilicone rubber, and spongy silicone rubbers obtained by adding a foaming agent to the foregoing silicone rubbers for foaming, as well as room temperature vulcanizing silicone rubbers. The substrate may be either formed entirely of such a solid or spongy silicone rubber or formed of another suitable material (e.g., clear nylon, polystyrene, acryl, vinyl chloride, polycarbonate, and cellulosic resins) and covered on the surface with such a solid or spongy silicone rubber.

The cured fluorine-containing silicones include silicones containing in their polysiloxane backbone a group such as a perfluoroalkyl group, a perfluoroalkylene group, a perfluoroalkylenoxy group,

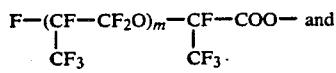

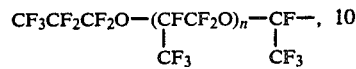

or silicones represented by the formula:

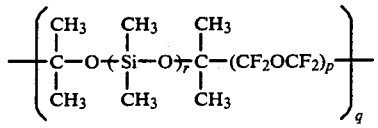

wherein m and n are positive integers inclusive of 0 and p, q, and r are positive integers, preferably m=0 to 5, n=0 to 5, p=1 to 100, q=1 to 1,000, and r=1 to 100, and the like. Preferably the cured fluorine-containing silicones are obtained by curing the products of an addition reaction between an alkenyl group-containing organopolysiloxane having a fluorinated substituent on a side chain and an organohydrogenpolysiloxane.

The alkenyl group-containing organopolysiloxane having a fluorinated substituent on a side chain preferably has the general formula (1):

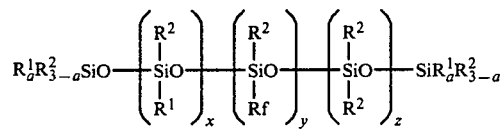
(1)

wherein $R^1$ is an alkenyl group having 2 to 6 carbon atoms, $R^2$ is an alkyl group having 1 to 8 carbon atoms or a phenyl group, Rf is a fluorinated substituent selected from the group consisting of

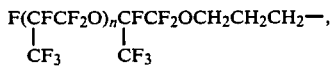

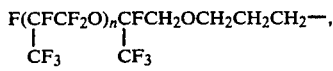

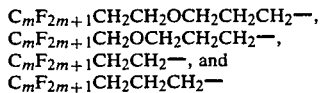

wherein n is an integer of 1 to 5 and m is an integer of 3 to 10, and letters a, x, y, and z are integers within the ranges: $1 \leq a \leq 3$, $0 \leq x$, $1 \leq y$, and $0 \leq z$. Preferred examples of the alkenyl group represented by $R^1$ are vinyl and allyl groups, with the polysiloxane of formula (1) preferably containing 2 vinyl or allyl groups per molecule. The fluorinated substituents represented by Rf are preferably present in an amount of at least 3 mol %, more preferably 3 to 30 mol % based on the total organic groups attached to the silicon atoms because oil repellency will sometimes be low with less than 3 mol % of fluorinated substituents. The fluorinated substituent of Rf most preferably has an ether bond.

The organohydrogenpolysiloxane which is subject to an addition reaction with the alkenyl group-containing organopolysiloxane of formula (1) preferably has the general formula (2):

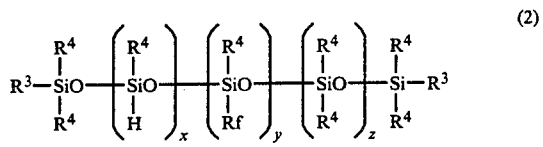
(2)

wherein $R^3$ is hydrogen, an alkyl group having 1 to 8 carbon atoms or a phenyl group, $R^4$ is an alkyl group having 1 to 8 carbon atoms or a phenyl group, Rf is a fluorinated substituent as defined above, and letters x, y, and z are integers within the ranges: $0 \leq x$, $1 \leq y$, and $0 \leq z$. The organohydrogenpolysiloxane of formula (2) preferably contains at least 3, more preferably 3 to 50 hydrogen atoms attached to the silicon atoms per molecule. The organohydrogenpolysiloxane of formula (2) preferably contains the fluorinated substituents represented by Rf in an amount of at least 3 mol %, more preferably 3 to 30 mol % based on the total organic groups attached to the silicon atoms from the standpoints of oil repellency and compatibility with the alkenyl group-containing organopolysiloxane of formula (1).

A cured fluorine-containing silicone is obtained by effecting an addition reaction between an alkenyl group-containing organopolysiloxane having a fluorinated substituent of formula (1) and an organohyirogenpolysiloxane having a fluorinated substituent of formula (2). The reactants are used in such a proportion as to give at least 0.5 hydrogen atoms attached to the silicon atoms of the siloxane of formula (2) per alkenyl group attached to the silicon atom of the siloxane of formula (1), more preferably the ratio of the hydrogen atoms attached to the silicon atoms in formula (2) to the alkenyl groups attached to the silicon atoms in formula (1) is 1/1 to 5/1.

A catalyst may be used for the addition reaction between an organopolysiloxane of formula (1) and an organohydrogen-polysiloxane of formula (2). The addition reaction catalyst may be selected from noble metals such as platinum, rhodium, iridium, and compounds thereof, with platinum catalysts being preferred. For example, chloroplatinic acid and complex salts of chloroplatinic acid with various olefins and vinylsiloxane may advantageously be used. The catalyst may be used in a catalytic amount, usually in the range of from 1 to 1,000 ppm of platinum based on the total weight of the organopolysiloxane of formula (1) and the organohydrogenpolysiloxane of formula (2). If desired, a reaction inhibitor against the platinum catalyst may be added to the reaction mixture, for example, organic nitrogen compounds, organic phosphorus compounds, and acetylene compounds.

It is not critical how one forms a cured fluorine-containing silicone on a surface of the substrate. For example, a cured coating of fluorine-containing silicone can be formed on the substrate surface by applying a mixture of an organopolysiloxane of formula (1), an organohydrogenpolysiloxane of formula (2), and a catalytic amount of an addition reaction catalyst to the substrate surface, and heat curing the silicone to the substrate. Application may be carried out by any well-known techniques including spray coating, brush coating, and dipping. The curing may be achieved by vulcanizing at 100° C./30 min. to 150° C./10 min. using a hot air blower. The thickness of the cured coating of fluorine-containing silicone is not critical although it generally ranges from about 1 to about 100 μm, preferably from 1 to 30 μm. To facilitate formation of a thin coating, the coating mixture as formulated above may be diluted with an organic solvent such as chlorofluorocarbon and metaxylenehexafluoride.

EXAMPLE

Examples of the invention are given below by way of illustration and not by way of limitation.

Examples 1–17 and Comparative Example

Table 2 shows vinyl-containing organopolysiloxanes having a fluorinated substituent Rf shown in Table 1. Table 3 shows organohydrogenpolysiloxanes. They were mixed so as to give a ≡SiH group to ≡SiCH=CH$_2$ group ratio (H/Vi) shown in Table 4. The complex salt of chloroplatinic acid and vinylsiloxane was added to the mixtures. The resulting compositions were diluted with Fron-113 (trade name of CF$_2$Cl-CFCl$_2$ manufactured by Mitsui Dupont Fluorochemical K.K.) to a concentration of 2% by weight, obtaining dipping solutions as shown in Table 4.

Nose pad substrates molded from a fluorine-free solid or spongy silicone rubber were once dipped in the dipping solutions and then heated at 100° C. for 30 minutes using a drying oven of hot air circulating type, obtaining cured films. The resulting nose pads appeared aesthetic for use in eyeglasses frames.

The nose pads were examined for outer appearance by the following tests to detect any discoloration. For comparison purposes, a control pad which had no cured coating of fluorine-containing silicone on the surface was also subjected to the same tests. The results are also shown in Table 4.

APPEARANCE TESTS (1) Weatherometer exposure

The appearance was examined after 180 hour exposure in a sunshine weatherometer.

(2) Artificial sweat immersion

The appearance was examined after 32 hour immersion in an artificial sweat equivalent solution.

(3) Vitalis immersion

The appearance was examined after 32 hour immersion in hair liquid Vitalis (trade name, Lion K.K.).

(4) Actual use

The appearance was examined after ten persons put on eyeglasses with the nose pads for 2 months.

TABLE 1

| | Fluorinated Substituent (Rf) |
|---|---|
| Designation | Structure |
| A | F(CFCF$_2$O)CFCH$_2$OCH$_2$CH$_2$CH$_2$—<br>　　│　　　│<br>　　CF$_3$　　CF$_3$ |
| B | F(CFCF$_2$O)$_2$CFCH$_2$OCH$_2$CH$_2$CH$_2$—<br>　　│　　　│<br>　　CF$_3$　　CF$_3$ |
| C | F(CFCF$_2$O)$_3$CFCH$_2$OCH$_2$CH$_2$CH$_2$—<br>　　│　　　│<br>　　CF$_3$　　CF$_3$ |
| D | F(CFCF$_2$O)$_2$CFCF$_2$OCH$_2$CH$_2$CH$_2$—<br>　　│　　　│<br>　　CF$_3$　　CF$_3$ |
| E | C$_3$F$_7$CH$_2$CH$_2$OCH$_2$CH$_2$CH$_2$— |
| F | C$_6$F$_{13}$CH$_2$CH$_2$OCH$_2$CH$_2$CH$_2$— |
| G | C$_8$F$_{17}$CH$_2$CH$_2$OCH$_2$CH$_2$CH$_2$— |
| H | C$_4$F$_9$CH$_2$OCH$_2$CH$_2$CH$_2$— |
| I | C$_4$F$_9$CH$_2$CH$_2$— |

TABLE 2

Vinyl-containing Organopolysiloxane
(Vi Siloxane)

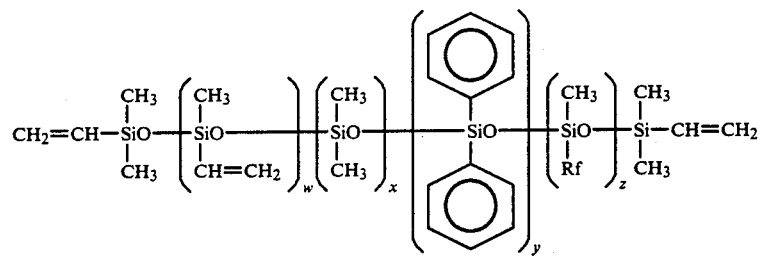

| | | Legend | | | |
|---|---|---|---|---|---|
| No. | Rf | w | x | y | z |
| V-1 | A | 0 | 240 | 0 | 120 |
| V-2 | B | " | " | " | " |
| V-3 | C | " | " | " | " |
| V-4 | D | " | " | " | " |
| V-5 | E | " | " | " | " |
| V-6 | F | " | " | " | " |
| V-7 | G | " | " | " | " |
| V-8 | H | " | " | " | " |
| V-9 | I | " | " | " | " |
| V-10 | B | " | 40 | " | 20 |
| V-11 | " | " | 660 | " | 340 |
| V-12 | " | 2 | 238 | " | 120 |

TABLE 2-continued

Vinyl-containing Organopolysiloxane (Vi Siloxane)

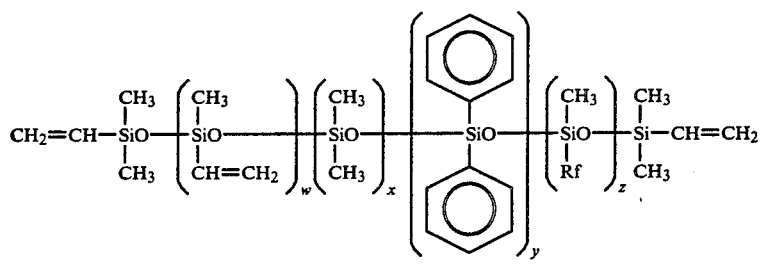

| No. | Rf | w | x | y | z |
|---|---|---|---|---|---|
| V-13 | " | 0 | 200 | 40 | 60 |

TABLE 3

Organohydrogenpolysiloxane (H siloxane)

| No. | Rf | Structure |
|---|---|---|
| H-1 | B | $(CH_3)_3SiO\left(\underset{H}{\overset{CH_3}{\mid}}SiO\right)_{25}\left(\underset{Rf}{\overset{CH_3}{\mid}}SiO\right)_{25}\left(\underset{CH_3}{\overset{CH_3}{\mid}}SiO\right)_{48}Si(CH_3)_3$ |
| H-2 | G | " |
| H-3 | I | " |
| H-4 | B | $H-\underset{CH_3}{\overset{CH_3}{\mid}}SiO\left(\underset{H}{\overset{CH_3}{\mid}}SiO\right)_{25}\left(\underset{Rf}{\overset{CH_3}{\mid}}SiO\right)_{25}\left(\underset{CH_3}{\overset{CH_3}{\mid}}SiO\right)_{50}\underset{CH_3}{\overset{CH_3}{\mid}}Si-H$ |
| H-5 | " | $\left[\underset{H}{\overset{CH_3}{\mid}}SiO\underset{Rf}{\overset{CH_3}{\mid}}SiO\right]_3$ | according to the present invention are significantly resistant against yellowing as compared with the conventional pad of the Comparative Example.

There has been described a member for eyeglasses having a surface coated with a cured fluorine-containing silicone. The cured coating of fluorine containing silicone can substantially prevent sweat and oil to penetrate into the member so that the member maintains an aesthetic appearance and close fit over its lifetime.

Although some preferred embodiments have been described, many modifications and variations may be made thereto in the light of the above teachings. It is therefore to be understood that within the scope of the appended claims, the invention may be practiced otherwise than as specifically described.

We claim:

1. A frame member for eyeglasses having a surface coated with a cured fluorine-containing silicone, wherein the cured fluorine-containing silicone is a cured product of an addition reaction between an alkenyl group-containing organopolysiloxane and an organohydrogenpolysiloxane, wherein said alkenyl group-containing organopolysiloxane has the general formula (1):

TABLE 4

Silicone Compositions and Anti-Yellowing

| | Cured F-containing silicone | | | Environmental tests and Yellowing** | | | |
|---|---|---|---|---|---|---|---|
| Example | Vi siloxane | H siloxane | V/Vi* | Weatheromerter exposure | Sweat immersion | Vitalis immersion | Actual use |
| 1 | V-1 | H-1 | 2.0 | NO | NO | NO | NO |
| 2 | V-2 | H-1 | 2.0 | NO | NO | NO | NO |
| 3 | V-3 | H-1 | 2.0 | NO | NO | NO | NO |
| 4 | V-4 | H-1 | 2.0 | NO | NO | NO | NO |
| 5 | V-5 | H-1 | 2.0 | NO | NO | NO | NO |
| 6 | V-6 | H-1 | 2.0 | NO | NO | NO | NO |
| 7 | V-7 | H-1 | 2.0 | NO | NO | NO | NO |
| 8 | V-8 | H-1 | 2.0 | NO | NO | NO | NO |
| 9 | V-10 | H-1 | 2.0 | NO | NO | NO | NO |
| 10 | V-11 | H-1 | 2.0 | NO | NO | NO | NO |
| 11 | V-12 | H-1 | 2.0 | NO | NO | NO | NO |
| 12 | V-13 | H-1 | 2.0 | NO | NO | NO | NO |
| 13 | V-2 | H-2 | 2.0 | NO | NO | NO | NO |
| 14 | V-2 | H-4 | 2.0 | NO | NO | NO | NO |
| 15 | V-2 | H-5 | 2.0 | NO | NO | NO | NO |
| 16 | V-2 | H-1 | 1.0 | NO | NO | NO | NO |
| 17 | V-9 | H-3 | 2.0 | NO | NO | NO | NO |
| Comparison | — | — | — | Little yellowed | Little yellowed | Yellowed | Yellowed |

As is evident from Table 4, the nose pads covered with a cured coating of fluorine-containing silicone

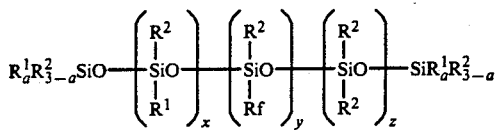

wherein $R^1$ is an alkenyl group having 2 to 6 carbon atoms, $R^2$ is an alkyl group having 1 to 8 carbon atoms or a phenyl group, Rf is a fluorinated substituent selected from the group consisting of

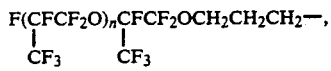

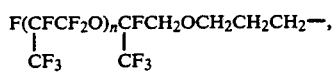

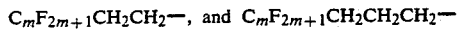

wherein n is an integer of 1 to 5 and m is an integer of 3 to 10, and letters a, x, y, and z are integers within the ranges: $1 \leq a \leq 3$, $0 \leq x$, $1 \leq y$, and $0 \leq z$, and said organohydrogenpolysiloxane has the general formula (2):

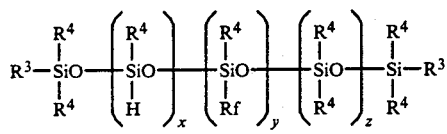

wherein $R^3$ is selected from the group consisting of hydrogen, an alkyl group having 1 to 8 carbon atoms and a phenyl group, $R^4$ is an alkyl group having 1 to 8 carbon atoms or a phenyl group, Rf is a fluorinated substituent as defined above, and letters x, y, and z are integers within the ranges $0 \leq x$, $1 \leq y$, and $0 \leq z$.

2. The eyeglass member of claim 1 which is a nose pad.

3. The eyeglass member of claim 1 which is an end piece of a temple.

4. The eyeglass member of claim 1 which comprises a substrate formed of a solid or spongy silicone rubber, said substrate being coated with the cured fluorine-containing silicone.

5. The eyeglass member of claim 1 which comprises a substrate formed of a thermoplastic resin selected from the group consisting of clear nylon, polystyrene, acrylic resin, vinyl chloride resin, polycarbonate, and cellulosic resin, the surface of said thermoplastic resin being partially or entirely covered with a solid or spongy silicone rubber, said substrate being coated with the cured fluorine-containing silicone.

6. An eyeglass frame member which is entirely formed from a cured fluorine-containing silicone, wherein the cured fluorine-containing silicone is a cured product of an addition reaction between an alkenyl group-containing organopolysiloxane and an organohydrogenpolysiloxane, wherein said alkeynyl group-containing organopolysiloxane has the general formula (1):

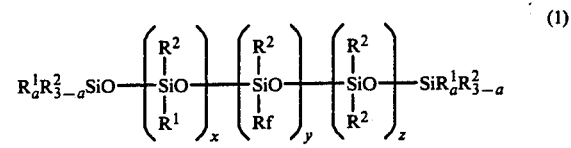

wherein $R^1$ is an alkenyl group having 2 to 6 carbon atoms, $R^2$ is an alkyl group having 1 to 8 carbon atoms or a phenyl group, Rf is a fluorinated substituent selected from the group consisting of

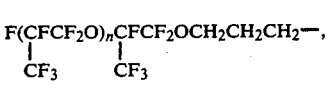

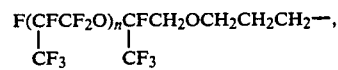

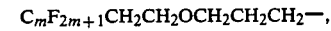

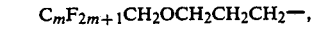

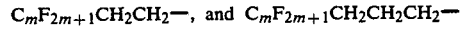

wherein n is an integer of 1 to 5 and m is an integer of 3 to 10, and letters a, x, y, and z are integers within the ranges: $1 \leq a \leq 3$, $0 \leq x$, $1 \leq y$, and $0 \leq z$, and said organohydrogenpolysiloxane has the general formula (2):

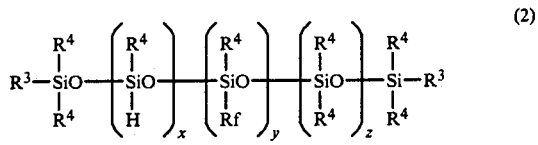

wherein $R^3$ is selected from the group consisting of hydrogen, an alkyl group having 1 to 8 carbon atoms and a phenyl group, $R^4$ is an alkyl group having 1 to 8 carbon atoms or a phenyl group, Rf is a fluorinated substituent as defined above, and letters x, y, and z are integers within the ranges $0 \leq x$, $1 \leq y$, and $0 \leq z$.

* * * * *